US00RE47738E

(19) United States
(12) Reissued Patent
Cooper

(10) Patent Number: US RE47,738 E
(45) Date of Reissued Patent: Nov. 26, 2019

(54) JOINT FOR USE IN AIRCRAFT CONSTRUCTION

(71) Applicant: Airbus Operations Limited, Bristol (GB)

(72) Inventor: Paul Anthony Cooper, Bristol (GB)

(73) Assignee: AIRBUS OPERATIONS LIMITED, Bristol (GB)

(21) Appl. No.: 13/886,454

(22) Filed: May 3, 2013

Related U.S. Patent Documents

Reissue of:
(64) Patent No.: 7,909,290
Issued: Mar. 22, 2011
Appl. No.: 12/097,328
PCT Filed: Nov. 28, 2006
PCT No.: PCT/GB2006/004439
§ 371 (c)(1),
(2) Date: Jun. 13, 2008
PCT Pub. No.: WO2007/071905
PCT Pub. Date: Jun. 28, 2007

(30) Foreign Application Priority Data

Dec. 20, 2005 (GB) ..... 0525896.7

(51) Int. Cl.
*B64C 1/12* (2006.01)
*B64C 3/26* (2006.01)

(52) U.S. Cl.
CPC . *B64C 3/26* (2013.01); *B64C 1/12* (2013.01)

(58) Field of Classification Search
CPC ..... B64C 3/26; B64C 1/12
See application file for complete search history.

(56) References Cited

U.S. PATENT DOCUMENTS 4,507,011 A * 3/1985 Brown ..... 403/404
4,888,451 A 12/1989 Toni et al.
(Continued)

FOREIGN PATENT DOCUMENTS

DE 704327 3/1941
GB 1022131 3/1966
(Continued)

OTHER PUBLICATIONS

English language machine translation of DE 704327, 3 pgs (retrieved from http://translationportal.epo.org/emtp/translate/?ACTION=description-retrieval&COUNTRY=DE&ENGINE=google&FORMAT=docdb&KIND=C&LOCALE=en_EP&NUMBER=704327&OPS=ops.epo.org/3.2&SRCLANG=de&TRGLANG=en).*
(Continued)

*Primary Examiner* — Robert M Fetsuga
(74) *Attorney, Agent, or Firm* — Nixon & Vanderhye P.C.

(57) ABSTRACT

A joint for use in aircraft construction, for example a wing, comprises: a cover skin having an interior surface, an exterior surface and a distal portion, said distal portion having an exterior-facing surface; and a butt-strap having a first portion for connection to the skin, said first portion having an interior surface, an exterior surface and a distal end. The first portion of the butt-strap is connected to the distal portion of the skin such that a junction is formed between the exterior surface of the skin and the exterior surface of the first portion of the butt-strap. The exterior-facing surface of the distal portion of the skin is of a shape complementary to the shape of the interior surface of the first portion of the butt-strap. The first portion of the butt-strap tapers towards its distal end such that, at said junction, the exterior surface of the skin and the exterior surface of the first portion of the butt-strap form a substantially continuous exterior surface.

35 Claims, 5 Drawing Sheets

(56) References Cited

U.S. PATENT DOCUMENTS

| | | | | |
|---|---|---|---|---|
| 5,803,406 | A * | 9/1998 | Kolodziej et al. | 244/171.7 |
| 6,375,120 | B1 * | 4/2002 | Wolnek | 244/123.8 |
| 7,021,856 | B2 * | 4/2006 | Assler et al. | 403/408.1 |
| 7,296,656 | B2 * | 11/2007 | Sanicki et al. | 181/210 |
| 2004/0070260 | A1 * | 4/2004 | Chung et al. | 301/59 |
| 2005/0213278 | A1 | 9/2005 | Hawley | |
| 2006/0032982 | A1 * | 2/2006 | Stephens | 244/131 |
| 2006/0251496 | A1 * | 11/2006 | Wood et al. | 411/507 |
| 2008/0164376 | A1 * | 7/2008 | Kato et al. | 244/132 |
| 2010/0006702 | A1 * | 1/2010 | Fogarty et al. | 244/131 |
| 2010/0065688 | A1 * | 3/2010 | Wood | 244/131 |
| 2010/0077690 | A1 * | 4/2010 | Durand | 52/578 |

FOREIGN PATENT DOCUMENTS

| | | |
|---|---|---|
| JP | 63-240494 | 10/1988 |
| WO | 82/00313 A1 | 2/1982 |

OTHER PUBLICATIONS

GB Search Report for GB0525896.7 dated Apr. 5, 2006. ISR for PCT/GB2006/004439 dated Mar. 16, 2007.

* cited by examiner

JOINT FOR USE IN AIRCRAFT CONSTRUCTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

The present application is *a Reissue of U.S. Pat. No. 7,909,290 B2, which is* based on International Application Number PCT/GB2006/004439 filed Nov. 28, 2006, and claims priority from British Application Number 0525896.7 filed Dec. 20, 2005, the disclosures of which are hereby incorporated by reference herein in their entirety.

FIELD OF THE INVENTION

The present invention relates to an improved joint arrangement suitable for use in aircraft construction. More particularly, although not exclusively, the present invention relates to an improved cover skin joint construction which is particularly suitable for joining aircraft components which have dissimilar physical properties. Even more particularly, although not exclusively, the present invention relates to an improved butt-strap and wing-skin cover joint for use in an aircraft wing for joining composites and metals.

BACKGROUND ART

Aircraft components including items such as wing skins and other panels are increasingly being made from composite materials, for example laminates. Direct attachment of leading and trailing edge structures, such as leading and trailing edge panels, to the wing skin is often impractical when using laminates. Pre-moulded precision-fit joints, known as joggles, are difficult to manufacture in thick laminates, would increase overhang size and may adversely affect the mechanical properties of the laminate. Furthermore, it is difficult to provide effective panel attachment through thick laminates.

It is known to fasten the leading and trailing edge panels of a wing to the wing skin using butt-straps located along the joint between the leading and trailing edges panels and the wing skin. These butt-straps secure the panels in place and ensure that the leading and trailing edges of the panels are properly aligned with the corresponding trailing and leading edges of the wing skin.

Conventionally, a metallic butt-strap 10 is used as shown in cross-section in FIG. 1. The butt-strap is attached to the inner mould line (IML) face of the wing skin that generally faces towards the interior of the wing. Prior art butt-strap 10 has a stepped, z-shaped profile, with a short vertical portion 10a joining two horizontal plate portions 10b,c. In this example, plate 10b fits over a portion of the IML face of cover 20 of the aircraft's wing skin such that the leading edge of cover 20 butts up against vertical portion 10a. This is bolted in place with bolt 30 that is countersunk into cover 20 on its outer-mould-line (OML) face.

Plate 10c is attached to the structure that is to be fixed to the leading edge of the cover. For example a "D"-nose leading edge skin 40 is shown attached to a wing cover leading edge 50 (FIG. 2). In order to reduce erosion of the composite skin 20 by airflow 60, the "D"-nose skin 40 is usually chosen to be sufficiently thick to overhang the leading edge 50 of cover 20. However, it is found that aerodynamic erosion still occurs and the increased thickness also increases drag. Aerodynamic erosion is often exacerbated when composite materials are used.

The prior-art butt-strap is also vulnerable to bird strike and similar collisions. FIG. 3 shows schematically how an impact on the leading-edge structure (not shown) attached by butt-strap 10 can lead to catastrophic forces on bolt 30.

The present invention seeks to ameliorate at least some of the abovementioned problems.

DISCLOSURE OF THE INVENTION

In a first aspect, the invention provides a joint for use in aircraft construction comprising:

(i) a cover skin having an interior surface, an exterior surface and a distal portion, said distal portion having an exterior-facing surface;

(ii) a butt-strap having a first portion for connection to the skin, said first portion having an interior surface, an exterior surface and a distal end;

wherein the first portion of the butt-strap is connected to the distal portion of the skin such that a junction is formed between the exterior surface of the skin and the exterior surface of the first portion of the butt-strap and wherein the exterior-facing surface of the distal portion of the skin is of a shape complementary to the shape of the interior surface of the first portion of the butt-strap and wherein the first portion of the butt-strap tapers towards its distal end such that, at said junction, the exterior surface of the skin and the exterior surface of the first portion of the butt-strap form a substantially continuous exterior surface.

The continuous exterior surface may correspond to a continuous curved or planar surface. The continuous exterior surface may be smooth or substantially smooth.

In a preferred embodiment, the thickness of the first portion of the butt-strap at the junction is non-zero but preferably small compared to the thickness of the cover skin. Where the thickness of the first portion of the butt-strap is non-zero, the first portion of the butt-strap is located so that a substantially continuous exterior surface is formed at said junction. The first portion of the butt-strap may be located so that, adjacent to the junction, the exterior surface of the skin is substantially coplanar with the exterior surface of the first portion of the butt-strap. The first portion of the butt-strap may be located so that, adjacent to the junction, the exterior surface of the skin and the exterior surface of the first portion of the butt-strap form a curved substantially continuous exterior surface.

The joint may include filler or a filler plate located in the recess formed by the distal end or edge of the first portion and the exterior surface of the cover skin adjacent the junction. The first portion of the butt-strap tapers towards its distal end, and may give the first portion a wedge-shaped profile. The tapering portion may form an angle of about 3° at its distal portion. The skin may be of substantially the same thickness in the proximal portion and in the distal portion and the distal portion may be offset from the proximal portion at an angle that orients the exterior-facing surface of the distal portion so that it is complementary to the tapering first portion of the butt-strap.

The first portion of the butt-strap may be connected to the skin by a fastener, for example a bolt, including a tapered washer or a tapered collar.

The butt-strap may comprise a second portion for connection to an aircraft structure such as a leading-edge or trailing-edge structure.

The cover skin may be made of a composite material. The butt-strap may be metallic.

The wing may further comprise a filler plate arranged to fill a space between the aircraft structure and the second portion of the butt-strap. The plate may be wedge-shaped.

The distal portion of the skin may be truncated at the upper or lower surface of its distal end. The truncated region may be of a shape complementary to the shape of a third portion of the butt-strap, the third portion being between the first portion and the second portion. The truncated region may act to retain the skin against the butt-strap.

The proximal portion and the distal portion of the second surface of the skin may meet to form a step region. A distal end of the butt-strap may be retained by the step region.

A plurality of said butt-straps may be spliced together by connection to an aircraft structure such as a leading- or trailing-edge structure. Alternatively, each butt strap may extend continuously under said structure.

The butt-strap may comprise a portion that extends into a pylon region of the wing. The distal portion of the skin may extend over the pylon portion of the butt-strap.

In a further aspect, the invention provides an aerodynamic surface, such as a wing, fin or horizontal stabilizer or the like, incorporating a joint as hereinbefore defined.

The exterior-facing surface of the distal portion of the skin may have been formed in a first region of the wing's leading or trailing edge by moulding and in a second region of the wing's leading or trailing edge by machining. The moulded region of the distal portion may run parallel to spars of the wing. The machined region may be located at an undercarriage rib of the wing.

The skin may comprise conductive foil and there may be electrical continuity between the butt-strap and said foil.

It may be that cut edges of the leading edge of the skin are protected, at least partially by the butt-strap, so that they are not exposed to the air stream in flight.

In an alternative embodiment, the second portion of the butt-strap may have the same form as the first portion of the butt-strap as hereinbefore defined and function in a similar manner as said first portion.

In a second aspect, the invention provides a method of manufacturing a joint for use in aircraft construction comprising forming a cover skin having an interior surface, an exterior surface and a distal portion, said distal portion having an exterior-facing surface, forming a butt-strap having a first portion for connection to the skin, said first portion having an interior surface, an exterior surface and a distal end wherein the method further comprises connecting the first portion of the butt-strap to the distal portion of the skin such that a junction is formed between the exterior surface of the skin and the exterior surface of the first portion of the butt-strap and wherein the exterior-facing surface of the distal portion of the skin is of a shape complementary to the shape of the interior surface of the first portion of the butt-strap and wherein the first portion of the butt-strap tapers towards its distal end such that, at said junction, the exterior surface of the skin and the exterior surface of the first portion of the butt-strap form a substantially continuous exterior surface.

The exterior-facing surface of the distal portion of the skin may be formed by moulding. The moulding may be carried out using a tool, shaped to form the exterior surface of the proximal portion, including an add-on to form the exterior-surface of the distal portion of the skin. The moulding may be carried out using a tool shaped to form both the exterior surface of the proximal portion and the exterior-facing surface of the distal portion of the skin.

The exterior-facing surface of the distal portion of the skin may be formed by machining. The exterior-facing surface of the distal portion of the skin may be formed by moulding in a first region of the aircraft component, such as a wing, and by machining in a second region.

The butt-strap and skin may be bonded together prior to being joined by a fastener.

A third aspect of the invention provides an aircraft constructed using one or more joints as hereinbefore defined.

It will be appreciated that aspects of the present invention described in relation to the method of the present invention are equally applicable to the apparatus of the present invention and vice versa.

BRIEF DESCRIPTION OF THE DRAWINGS

Certain illustrative embodiments of the invention will now be described in detail, by way of example only, with reference to the accompanying schematic drawings, in which.

DETAILED DESCRIPTION

Figure 4:
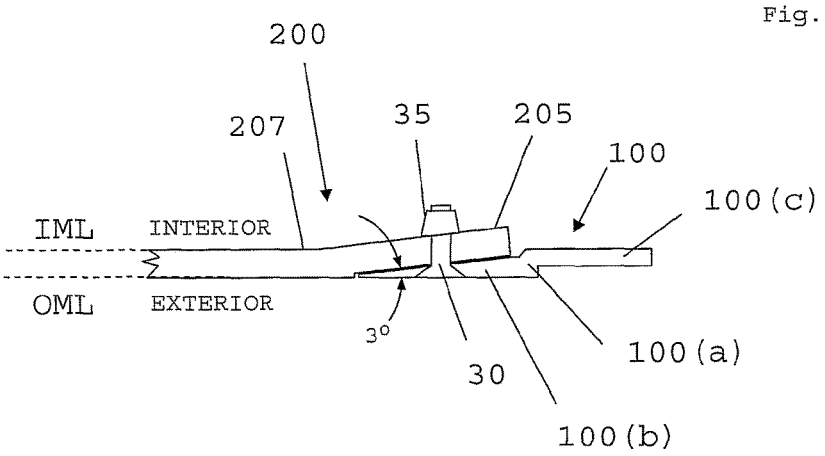
FIG. 4 is a cross-sectional view in an inboard/outboard direction of a butt-strap according to an embodiment of the present invention attached to the leading edge of the skin of an aircraft wing.

Referring to FIG. 4, an embodiment of a butt-strap 100 is shown in profile and is seen to be in the form of a mildly stepped, z-shaped profile, with a short vertical portion 100a joining two horizontal plate portions 100b,c. According to this embodiment, plate 100b has a wedge-shaped profile, tapering from its thickest point near the vertical portion 100a to a thin, distal end. In a preferred variant, the thickness of the first portion at the junction formed by the exterior surface of the cover skin at the exterior surface of the butt-strap (i.e.; the distal end) is zero. When the joint is created, this would form an essentially perfect planar seam joining the cover and the butt-strap. However, in practice, most practical embodiments will have a small, but non-zero thickness at the distal end of the first portion such as shown in FIG. 4. According to this particular embodiment, the interior, tapering surface forms an angle of about 3° with the exterior face of plate 100b.

Butt-strap 100 is bolted in place on the OML of cover 200 with bolt 30, which is countersunk into tapered plate 100b on its exterior face. Cover 200 comprises a proximal portion 207, which forms most of the wing skin and a distal, angled portion 205. The exterior-facing surface of distal portion 205 recedes at an angle of 3° from the exterior surface of the proximal portion of cover 200. In that way, the exterior-facing surface of distal portion 205, in this example at its leading edge, is of a shape complementary to the shape of the interior, tapering surface of butt-strap plate 100b. The exterior surface of the proximal portion 207 of cover 200 and the exterior surface of plate 100b thus form a substantially continuous surface of the wing. This ideally forms a continuous planar exterior surface.

The butt-strap 100 may be extruded or machined from aluminium plate, depending on the complexity of the skin contour it needs to match. Internally, where there are no fittings, the fastener collars sit on tapered washers or have collars 35 that accommodate the 3° angle (as shown in FIG. 4).

Figure 5:
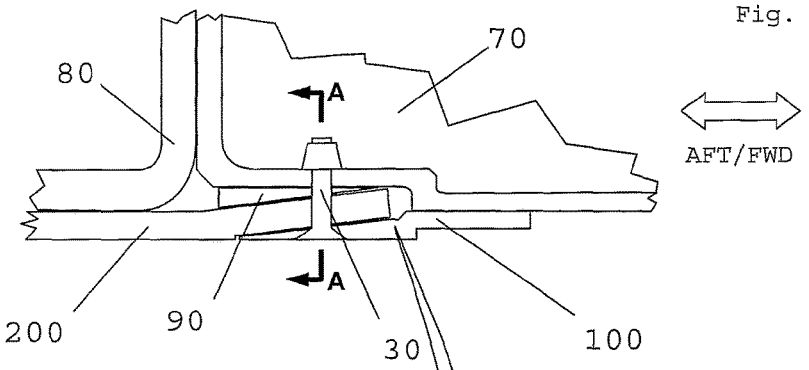
FIG. 5 shows installation of the butt-strap of FIG. 4 at a leading- or trailing-edge fitting.

The butt-strap 100 in this example is used (FIG. 5) to secure a leading edge fitting 70 to cover 200. Throughout the wing, where leading edge/trailing edge (LE/TE) fittings are present, tapered aluminium plates 90 are installed, to level off the angle of the taper 205 of cover 200, provide adjustment to accommodate the various interface tolerances, to act as spreader plates for the fittings 70, and to act as electrical bonding straps.

Leading edge fitting 70 butts up against spar 80 and the distal end of cover portion 205, which it overlaps by approximately the length of the butt-strap 100. Because of the angled portion 205 of cover 200, there is a wedge-shaped gap between fitting 70 and cover 200. This is filled in with tapered plate 90, through which bolt 30 also passes.

The butt-straps 100 and internal plates 90 are bonded onto the cover 200 prior to the installation of fastener 30. Use of a paste adhesive/shim material such as such as Hysol EA934 allows for the setting of the various dimensions of the construction. A combination of fore/aft movement of the taper and the use of liquid shim provides sufficient freedom of adjustment to achieve the correct dimensional fit-up.

The fit of the LE/TE fittings 70 themselves is dependent on the girth tolerance for spar 80 and the angular relationship between the spar web and the pads on the covers 200. As such tolerance management is demanding and may require shimming/fettling of these components on assembly, as is done on prior-art metal wings.

Figure 6:
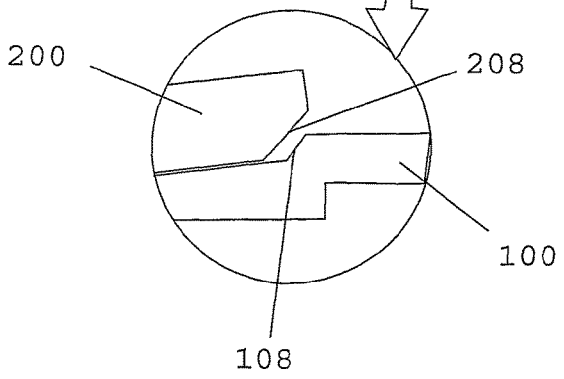
FIG. 6 shows a detail of the butt-strap and cover of FIG. 5.

The distal end of the angled portion 205 of cover 200 may also be truncated at its lower edge (FIG. 6), forming a more steeply tapered surface 208 that butts up against a corresponding sloped surface 108 on vertical portion 100a of butt-strap 100. The leading edge of the skin portion 205 is thus retained in place against butt-strap 100.

Figure 7:
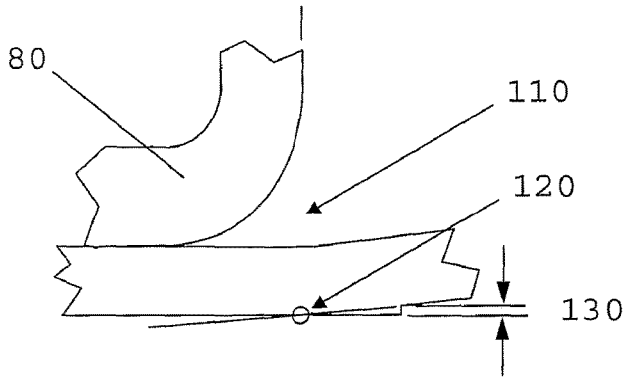
FIG. 7 shows another detail of the butt-strap and spar of FIG. 5.

The arrangement of spar 80 and cover 200 is shown in more detail in FIG. 7. Heel line 120 is the line at which the plane coincident with the outer mould line of the angled portion 205 of cover 200, if extended sufficiently, would meet the outer surface of the rest of cover 200. Heel line 120 is in line with the leading edge of spar 80. That extended plane is not the true outer surface of cover 200. Rather, the angled portion of cover 200 stops short of the non-angled portion, which is itself extended beyond heel line 120, thus forming step 130, which acts to constrain aft-ward movement of the distal end of portion 100b.

Figure 8:
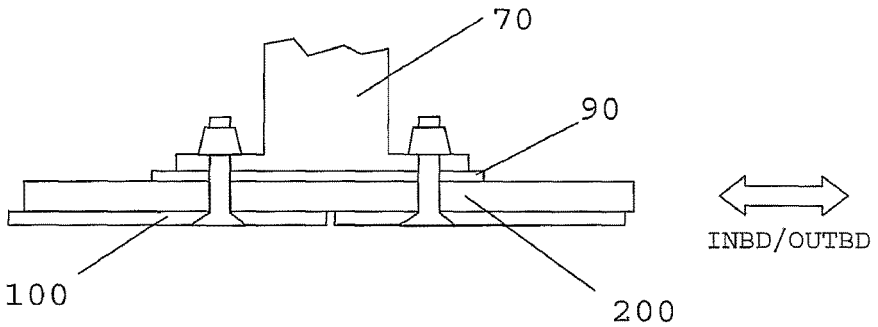
FIG. 8 is a cross-sectional view in an aft direction of the butt-strap of FIG. 5, through AA.

Leading edge fitting 70 is used to splice sections of butt-strap 100 together (FIG. 8). In an alternative embodiment, (not shown) butt-strap 100 runs continuously under fitting 70.

All regions that would otherwise have aluminium in contact with the cover 200 or spar 80 are faced with glass cloth to inhibit corrosion.

At a pylon "grow-out" (FIG. 9), the angled distal portion of cover 200' does not form the ultimate distal end of cover 200', but rather leads into a further distal portion that is parallel to (but displaced from) the rest of the non-angled cover 200'. Cover 200' thus extends over plate 100c of butt-strap 100 at pylon grow-out regions of the wing.

Figure 9:
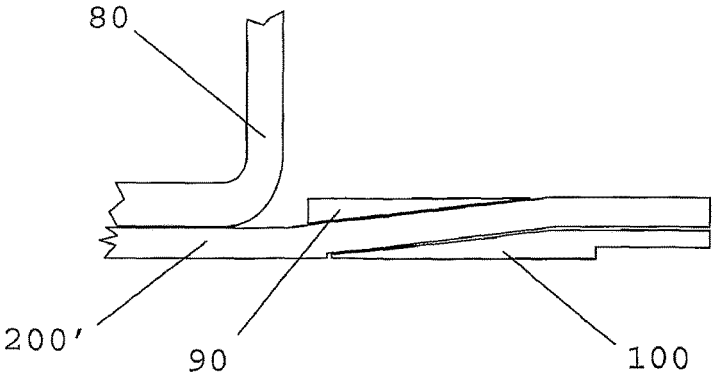
FIG. 9 is a cross-sectional view in an inboard direction of an installation of the butt-strap of FIG. 4 at a pylon grow-out.
Figure 10:
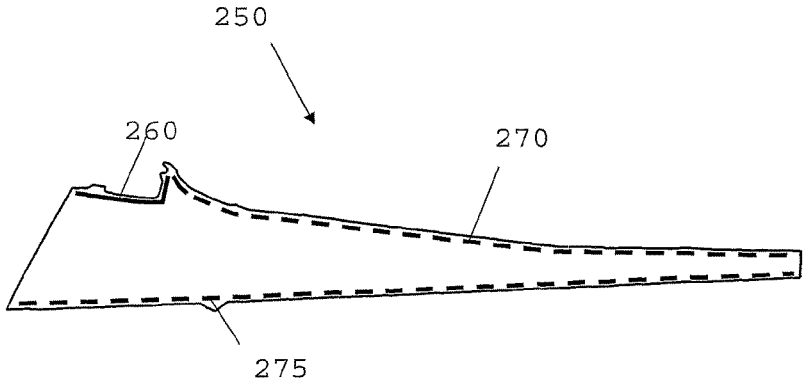
FIG. 10 shows an aircraft wing, in which areas to receive the butt-strap of FIG. 4 are marked according to the method used to profile those areas.

The (reflex-) angled portion 205 of cover 200 is moulded into the cover in some regions 270 of, for example, the aircraft wing 250 and machined in other regions 260 (FIG. 10). The butt-strap 100 runs parallel to the front and rear spars of wing 250 for most of the wing's length (dashed line in FIG. 10). At the undercarriage rib it deviates and follows the (shark's fin) contour of the skin in that area 260 (solid line in FIG. 12). At the front spar pylon area 275, however, the strap 100 continues parallel to the front spar (FIGS. 9 and 10). The strap 100 can either be extended forward as illustrated in FIG. 9 or a separate section can be added forward, effectively to extend the leading edge panel land. In both cases this extra material acts as a spreader plate or reinforcement for the pylon fitting.

The angle to be moulded at the cover edges requires early definition, especially if the skin tool itself is to be manufactured to this profile. As discussed above, the angle is moulded parallel to the front or rear spars (with the exception of the outboard section 260 of the "sharks fin"). Thus only a small amount of detail definition is required to establish the location of the start (heel line 110) of the 3° angle. The heel line 110 is positioned close to the centre of the chord to provide maximum flexibility to fastener and part edge changes later in the design (albeit possibly at a small weight penalty).

Figure 11:
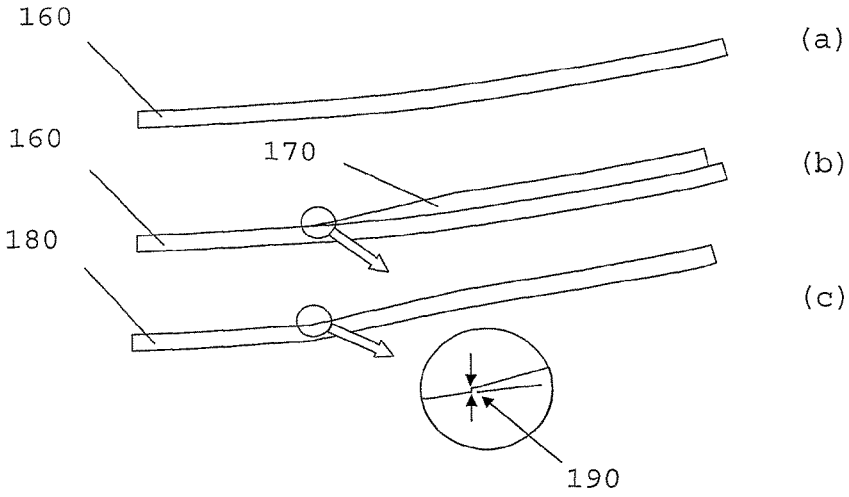
FIG. 11 shows three configuration options (a) to (c) for a skin tool for moulding the wing-skin.

It will be apparent from the above discussion that use of an external butt-strap has implications for the cover 200's outer mould line. Moulding the cover to accept the butt-strap is preferable from an engineering standpoint. The feature can be accommodated into the tooling in two principal ways: (1) by machining the tool 180 so that it incorporates the additional taper (FIGS. 11c); and (2) by adding separate tapered features 170 to the tool, for example by bolting them on post completion of the main tool 160 (FIG. 11a & b)

Machining the tool is preferable from a cost cure cycle perspective but has the disadvantage of requiring definition very early on in the manufacturing programme. The major drawback of using additional "bolt-on" components is the adverse effect that has on the thermal properties of the tool, which must be accounted for in tool design and component cure cycle.

As an alternative to moulding the taper profile into the cover 200, a third option is to machine the angle post-cure. That may be the preferred approach where moulding of the feature is difficult or impractical, for example in regions difficult to tape lay or where component wrinkling is expected. Generally, the cover 200 is likely to be particularly thick (for example, thicker then 20 mm) in such areas and so machining the taper and exposing fibres is likely to be of little structural consequence. Further, it is envisaged that any delamination that does occur will be restrained by bolts 30 at the butt-strap 100, spar 80 and LE/TE fittings 70. It is envisaged that tooling of the 3° additional taper will be acceptable for most areas 270 of the outer part of the wing 250, as the angle is shallow and there are no other adjacent tooling complexities. At the gear rib 260, however, the feature follows the contour of the "sharks fin" and tape-laying difficulties and ply wrinkling could be experienced in this region, so post-cure machining of the cover is used in these regions 260, with transition regions to blend the machined profile back into the moulded profile.

Figure 12:
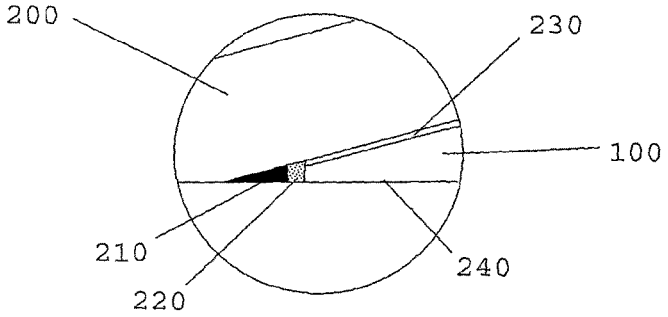
FIG. 12 shows blending of the butt-strap of FIG. 4 into the wing skin.

The external butt-strap arrangement produces, in some embodiments an extra gap/step between strap 100 and cover 200 on the aerodynamic surface (FIG. 12). The butt-strap 100 is set onto the skin as part of the skin assembly. As previously described, the strap 100 is bonded/shimmed into place using a suitable adhesive 230 to ensure compliance with the OML 240 as the primary datum. Additionally the taper of the strap 100 can be used to gain adjustment by moving the component fore and aft over the skin. If that results in a foul with the resin edge on the skin, the butt-strap 100 can be fettled to fit. As can be seen in FIG. 12 the skin moulding process will leave a resin edge 210 that together with the butt-strap 100 will provides a distinct "channel" to retain any aero filler 220 required to complete the transition.

Figure 1:
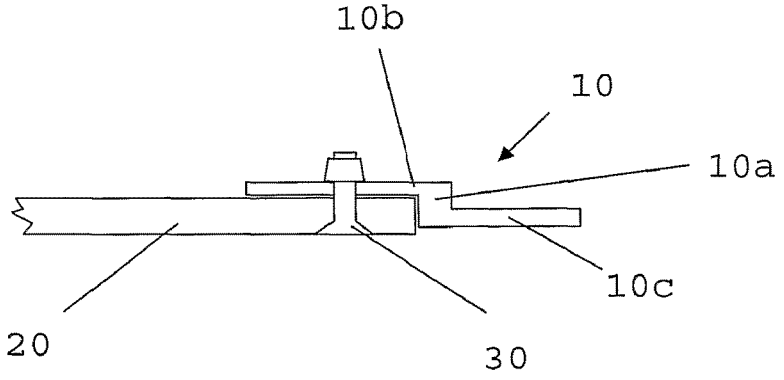
Fig. 1 (Prior art)
FIG. 1 is a cross-sectional view in an inboard direction of a prior-art butt-strap attached to the leading edge of the skin of an aircraft wing.
Figure 2:
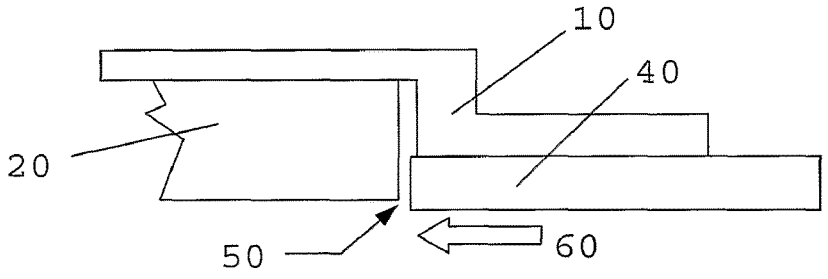
Fig. 2 (Prior art)
FIG. 2 shows the arrangement of FIG. 1 further including a portion of D-nose skin.

The external butt-strap approach of the invention provides the benefit of erosion protection of the composite cover 200 by ensuring that there are no cut edges of the cover 200 exposed to the air stream, an important consideration at the leading edge, rather, the cut edge of the cover 200 is inside the wing, shielded by butt-strap 100. In contrast, the internal butt-strap arrangement of the prior art (FIG. 2) results in the composite cover 200 having an exposed edge 50 which is susceptible to aerodynamic erosion.

Figure 3:
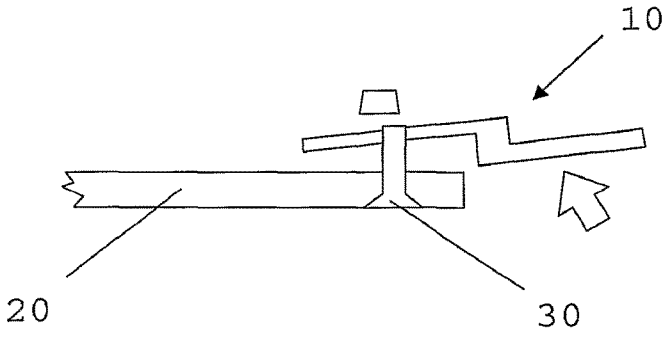
Fig. 3 (Prior art)
FIG. 3 is an illustration of the effects of bird strike on the arrangement of FIG. 1.
Figure 13:
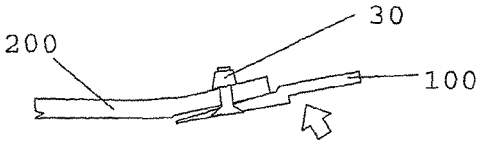
FIG. 13 is an illustration of the effects of bird strike on the arrangement of FIG. 4.

Because butt-strap 100 sits outside the angled portion of cover 200, bird-strike resistance is also improved (FIG. 13). The force resulting from an impact on plate 100b or 100c will be passed in a large part directly into cover 200, without putting bolt 30 into excessive tension (c.f. FIG. 3).

Figure 14:
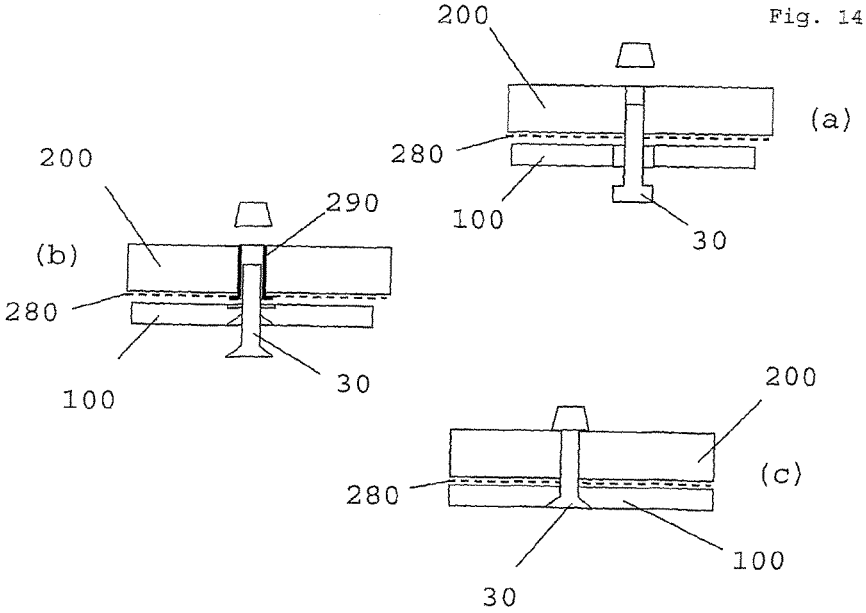
FIG. 14 shows lighting protection arrangements for the butt-strap of FIG. 4.

The butt-strap arrangement also forms part of the aircraft's lightning protection scheme by providing conducting paths for current resulting from a lightening strike (FIG. 14). There are four distinct conducting paths for the current: at each butt-strap location on the upper and lower, leading and trailing edges. Each conducting path, whilst separate from the others, forms a continuous path in which the current can flow, with electrical continuity between the butt-strap sections 100 and to the bronze mesh/foil 280 in the cover 200 itself.

Continuity between butt-strap sections 100 can be achieved by the arrangement of FIG. 8. Established joining techniques should ensure good electrical bonding Connection to bronze mesh/foil 280 is achieved in this example via a conducting sleeve 290 around bolt 30 (FIG. 14(b)). Attempting to link the butt-strap 100 directly to the mesh/foil 290 is not appropriate due to the potential for corrosion. Alternative arrangements include connecting butt-strap 100 to mesh/foil 280 via bolts 30, either at the bolt's head (FIG. 14(a) or at a region along its length (FIG. 14(c)).

Whilst the present invention has been described and illustrated with reference to particular embodiments, it will be appreciated by those of ordinary skill in the art that the invention lends itself to many different variations not specifically illustrated herein. Some examples of such variations and alternatives have been described above.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

[1. A joint for use in aircraft construction comprising:

(i) a cover skin having an interior surface, an exterior surface and a distal portion, said distal portion having an exterior-facing surface;

(ii) a butt-strap having a first portion for connection to the skin, said first portion having an interior surface, an exterior surface and a distal end;

wherein the first portion of the butt-strap is connected to the distal portion of the skin such that a junction is formed between the exterior surface of the skin and the exterior surface of the first portion of the butt-strap and wherein the exterior-facing surface of the distal portion of the skin is of a shape complementary to the shape of the interior surface of the first portion of the butt-strap and wherein the first portion of the butt-strap tapers towards its distal end such that, at said junction, the exterior surface of the skin and the exterior surface of the first portion of the butt-strap form a substantially continuous exterior surface.]

2. A joint as claimed in claim [1] *9,* wherein the thickness of the first portion of the butt-strap at the junction is small compared to the thickness of the cover skin.

3. A joint as claimed in claim 2, wherein the thickness of the distal end of the first portion of the butt-strap is substantially zero.

4. A joint as claimed in claim [1] *9*, wherein the first portion of the butt-strap is located so that, adjacent to the junction, the exterior surface of the skin is substantially coplanar with the exterior surface of the first portion of the butt-strap.

[5. A joint as claimed in claim 1, wherein the first portion of the butt-strap is located so that, adjacent to the junction, the exterior surface of the skin and the exterior surface of the first portion of the butt-strap form a curved substantially continuous exterior surface.]

6. A joint [as claimed in claim 1] *for use in aircraft construction comprising:*

*(i) a cover skin having an interior surface, an exterior surface and a distal portion, said distal portion having an exterior-facing surface;*

*(ii) a butt-strap having a first portion for connection to the skin, said first portion having an interior surface, an exterior surface and a distal end;*

*wherein the first portion of the butt-strap is connected to the distal portion of the skin such that a junction is formed between the exterior surface of the skin and the exterior surface of the first portion of the butt-strap and wherein the exterior-facing surface of the distal portion of the skin is of a shape complementary to the shape of the interior surface of the first portion of the butt-strap and wherein the first portion of the butt-strap tapers towards its distal end such that, at said junction, the exterior surface of the skin and the exterior surface of the first portion of the butt-strap form a substantially continuous exterior surface*, wherein the joint includes filler [or a filler plate] located in a [recess] *channel* formed by the distal end of the first portion *of the butt-strap* and the exterior surface of the cover skin adjacent the junction.

7. A joint as claimed in claim [1] *9*, wherein the first portion is wedge-shaped.

8. A joint as claimed in claim [1] *9*, wherein the tapering portion forms an angle of approximately 3° at its distal portion.

9. A joint [as claimed in claim 1] *for use in aircraft construction comprising:*

(*i*) *a cover skin having an interior surface, an exterior surface and a distal portion said distal portion having an exterior-facing surface;*

(*ii*) *a butt-strap having a first portion for connection to the skin, said first portion having an interior surface, an exterior surface and a distal end;*

*wherein the first portion of the butt-strap is connected to the distal portion of the skin such that a junction is formed between the exterior surface of the skin and the exterior surface of the first portion of the butt-strap and wherein the exterior-facing surface of the distal portion of the skin is of a shape complementary to the shape of the interior surface of the first portion of the butt-strap and wherein the first portion of the butt-strap tapers towards its distal end such that, at said junction, the exterior surface of the skin and the exterior surface of the first portion of the butt-strap form a substantially continuous exterior surface*, wherein the skin is of substantially the same thickness in the proximal portion and in the distal portion and the distal portion is offset from the proximal portion at an angle that orients the exterior-facing surface of the distal portion so that it is complementary to the tapering first portion of the butt-strap.

10. A joint as claimed in claim [1] *9*, wherein the first portion of the butt-strap is connected to the skin by a fastener.

[11. A joint as claimed in claim 1, wherein the butt-strap comprises a second portion for connection to an aircraft structure.]

12. A joint as claimed in claim [1] *9, wherein the butt-strap comprises a second portion for connection to an aircraft structure, and* wherein the aircraft structures include a leading-or trailing-edge structure.

13. A joint as claimed in claim [1] *9*, wherein the cover skin is made of a composite material.

14. A joint as claimed in claim [1] *9*, wherein the butt-strap is made of a metallic material.

[15. A joint as claimed in claim 1, further comprising a filler plate arranged to fill a space between the aircraft structure and the second portion of the butt-strap.]

[16. A joint as claimed in claim 15 wherein the plate is wedge-shaped.]

17. A joint as claimed in claim [1] *9*, wherein the distal portion of the skin is truncated at the upper or lower surface of its distal end.

18. A joint as claimed in claim 17 wherein the truncated region has a shape complementary to the shape of a third portion of the butt-strap, the third portion being between the first portion and the second portion.

19. A joint as claimed in claim 17, wherein the truncated region acts to retain the skin against the butt-strap.

20. A joint as claimed in claim [1] *9*, wherein the *cover skin further comprises a proximal portion and wherein the* proximal portion and the distal portion of the [second] *exterior* surface of the skin meet to form a step region.

21. A joint as claimed in claim 20 wherein the step region retains a distal end of the butt-strap.

22. A joint as claimed in claim [1] *9*, wherein a plurality of said butt-straps is spliced together by connection to an aircraft structure.

23. A joint as claimed in claim [1] *9*, wherein the butt-strap comprises a portion that extends into a pylon region of the wing.

[24. An aircraft structure, aerodynamic surface, wing, fin or horizontal stabilizer, incorporating a joint as claimed in claim 1.]

[25. A wing incorporating a joint as claimed in claim 1, wherein the exterior-facing surface of the distal portion of the skin is formed in a first region of the wing's leading or trailing edge by moulding and in a second region of the wing's leading or trailing edge by machining.]

[26. A wing as claimed in claim 25 wherein the moulded region of the distal portion runs parallel to spars of the wing.]

[27. A wing as claimed in claim 25, wherein the machined region is located at an undercarriage rib of the wing.]

28. A joint as claimed in claim [1] *9, wherein the butt-strap comprises a second portion for connection to an aircraft structure, and* wherein the second portion of the butt-strap has the same form as the first portion and functions in a similar manner to said first portion.

[29. A method of manufacturing a joint for use in aircraft construction comprising forming a cover skin having an interior surface, an exterior surface and a distal portion, said distal portion having an exterior-facing surface, forming a butt-strap having a first portion for connection to the skin, said first portion having an interior surface, an exterior surface and a distal end wherein the method further comprises connecting the first portion of the butt-strap to the distal portion of the skin such that a junction is formed between the exterior surface of the skin and the exterior surface of the first portion of the butt-strap and wherein the exterior-facing surface of the distal portion of the skin is of a shape complementary to the shape of the interior surface of the first portion of the butt-strap and wherein the first portion of the butt-strap tapers towards its distal end such that, at said junction, the exterior surface of the skin and the exterior surface of the first portion of the butt-strap form a substantially continuous exterior surface.]

[30. A method as claimed in claim 29 wherein the exterior-facing surface of the distal portion of the skin is formed by moulding.]

[31. An aircraft constructed using one or more joints as claimed in claim 1.]

*32. A joint as claimed in claim 10, wherein said fastener is a bolt including a tapered washer.*

*33. A joint as claimed in claim 10, wherein said fastener is a bolt including a tapered collar.*

*34. A method of manufacturing the joint as claimed in claim 6, the method comprising: forming a cover skin having an interior surface, an exterior surface and a distal portion said distal portion having an exterior-facing surface, forming a butt-strap having a first portion for connection to the skin, said first portion having an interior surface, an exterior surface and a distal end wherein the method further comprises connecting the first portion of the butt-strap to the distal portion of the skin such that a junction is formed between the exterior surface of the skin and the exterior surface of the first portion of the butt-strap and wherein the exterior-facing surface of the distal portion of the skin is of a shape complementary to the shape of the interior surface of the first portion of the butt-strap and wherein the first portion of the butt-strap tapers towards its distal end such that, at said junction, the exterior surface of the skin and the*

*exterior surface of the first portion of the butt-strap form a substantially continuous exterior surface.*

*35. A method of manufacturing the joint as claimed in claim 9, the method comprising: forming a cover skin having an interior surface, an exterior surface and a distal portion, said distal portion having an exterior-facing surface, forming a butt-strap having a first portion for connection to the skin, said first portion having an interior surface, an exterior surface and a distal end wherein the method further comprises connecting the first portion of the butt-strap to the distal portion of the skin such that a junction is formed between the exterior surface of the skin and the exterior surface of the first portion of the butt-strap and wherein the exterior-facing surface of the distal portion of the skin is of a shape complementary to the shape of the interior surface of the first portion of the butt-strap and wherein the first portion of the butt-strap tapers towards its distal end such that, at said junction, the exterior surface of the skin and the exterior surface of the first portion of the butt-strap form a substantially continuous exterior surface.*

*36. An aircraft wing, an aircraft fin, or an aircraft horizontal stabilizer, incorporating a joint comprising:*

*(i) a cover skin having an interior surface, an exterior surface and a distal portion, said distal portion having an exterior-facing surface;*

*(ii) a butt-strap having a first portion for connection to the skin, said first portion having an interior surface, an exterior surface and a distal end;*

*wherein the first portion of the butt-strap is connected to the distal portion of the skin such that a junction is formed between the exterior surface of the skin and the exterior surface of the first portion of the butt-strap and wherein the exterior-facing surface of the distal portion of the skin is of a shape complementary to the shape of the interior surface of the first portion of the butt-strap and wherein the first portion of the butt-strap tapers towards its distal end such that, at said junction, the exterior surface of the skin and the exterior surface of the first portion of the butt-strap form a substantially continuous exterior surface, wherein the joint includes filler located in a channel formed by the distal end of the first portion and the exterior surface of the cover skin adjacent the junction.*

*37. An aircraft wing, an aircraft fin, or an aircraft horizontal stabilizer, incorporating a joint comprising:*

*(i) a cover skin having an interior surface, an exterior surface and a distal portion said distal portion having an exterior-facing surface;*

*(ii) a butt-strap having a first portion for connection to the skin, said first portion having an interior surface, an exterior surface and a distal end;*

*wherein the first portion of the butt-strap is connected to the distal portion of the skin such that a junction is formed between the exterior surface of the skin and the exterior surface of the first portion of the butt-strap and wherein the exterior-facing surface of the distal portion of the skin is of a shape complementary to the shape of the interior surface of the first portion of the butt-strap and wherein the first portion of the butt-strap tapers towards its distal end such that, at said junction, the exterior surface of the skin and the exterior surface of the first portion of the butt-strap form a substantially continuous exterior surface, wherein the skin is of substantially the same thickness in the proximal portion and in the distal portion and the distal portion is offset from the proximal portion at an angle that orients the exterior-facing surface of the distal portion so that it is complementary to the tapering first portion of the butt-strap.*

*38. A wing incorporating a joint as claimed in claim 6, wherein the exterior-facing surface of the distal portion of the skin is formed in a first region of a wing's leading or trailing edge by molding and in a second region of the wing's leading or trailing edge by machining.*

*39. A wing incorporating a joint as claimed in claim 9, wherein the exterior-facing surface of the distal portion of the skin is formed in a first region of a wing's leading or trailing edge by molding and in a second region of the wing's leading or trailing edge by machining.*

*40. An aircraft constructed using one or more joints each comprising:*

*(i) a cover skin having an interior surface, an exterior surface and a distal portion, said distal portion having an exterior-facing surface;*

*(ii) a butt-strap having a first portion for connection to the skin, said first portion having an interior surface, an exterior surface and a distal end;*

*wherein the first portion of the butt-strap is connected to the distal portion of the skin such that a junction is formed between the exterior surface of the skin and the exterior surface of the first portion of the butt-strap and wherein the exterior-facing surface of the distal portion of the skin is of a shape complementary to the shape of the interior surface of the first portion of the butt-strap and wherein the first portion of the butt-strap tapers towards its distal end such that, at said junction, the exterior surface of the skin and the exterior surface of the first portion of the butt-strap form a substantially continuous exterior surface, wherein the joint includes filler located in a channel formed by the distal end of the first portion and the exterior surface of the cover skin adjacent the junction.*

*41. An aircraft constructed using one or more joints each comprising:*

*(i) a cover skin having an interior surface, an exterior surface and a distal portion said distal portion having an exterior-facing surface;*

*(ii) a butt-strap having a first portion for connection to the skin, said first portion having an interior surface, an exterior surface and a distal end;*

*wherein the first portion of the butt-strap is connected to the distal portion of the skin such that a junction is formed between the exterior surface of the skin and the exterior surface of the first portion of the butt-strap and wherein the exterior-facing surface of the distal portion of the skin is of a shape complementary to the shape of the interior surface of the first portion of the butt-strap and wherein the first portion of the butt-strap tapers towards its distal end such that at said junction, the exterior surface of the skin and the exterior surface of the first portion of the butt-strap form a substantially continuous exterior surface, wherein the skin is of substantially the same thickness in the proximal portion and in the distal portion and the distal portion is offset from the proximal portion at an angle that orients the exterior-facing surface of the distal portion so that it is complementary to the tapering first portion of the butt-strap.*

*42. A wing as claimed in claim 38 wherein the moulded region of the distal portion runs parallel to spars of the wing.*

*43. A wing as claimed in claim 39 wherein the moulded region of the distal portion runs parallel to spars of the wing.*

*44. A wing as claimed in claim 38, wherein the machined region is located at an undercarriage rib of the wing.*

*45. A wing as claimed in claim 39, wherein the machined region is located at an undercarriage rib of the wing.*

*46. A method as claimed in claim 34 wherein the exterior-facing surface of the distal portion of the skin is formed by moulding.*

*47. A method as claimed in claim 35 wherein the exterior-facing surface of the distal portion of the skin is formed by moulding.*

* * * * *